Jan. 15, 1935.  B. A. MORTON  1,987,788
AIRCRAFT
Filed Dec. 3, 1932  2 Sheets-Sheet 2
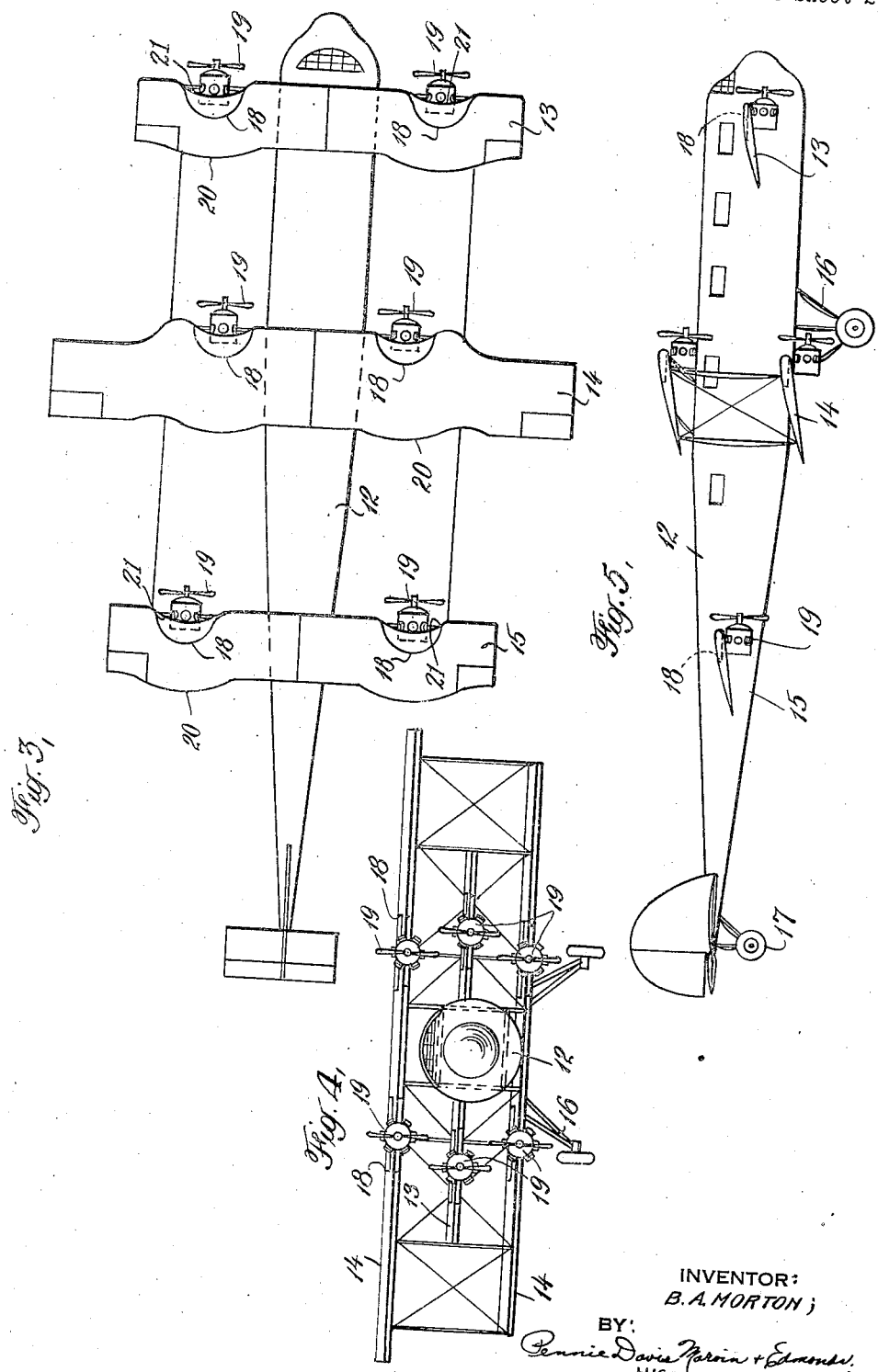
INVENTOR:
B. A. MORTON;
BY:
HIS ATTORNEYS.

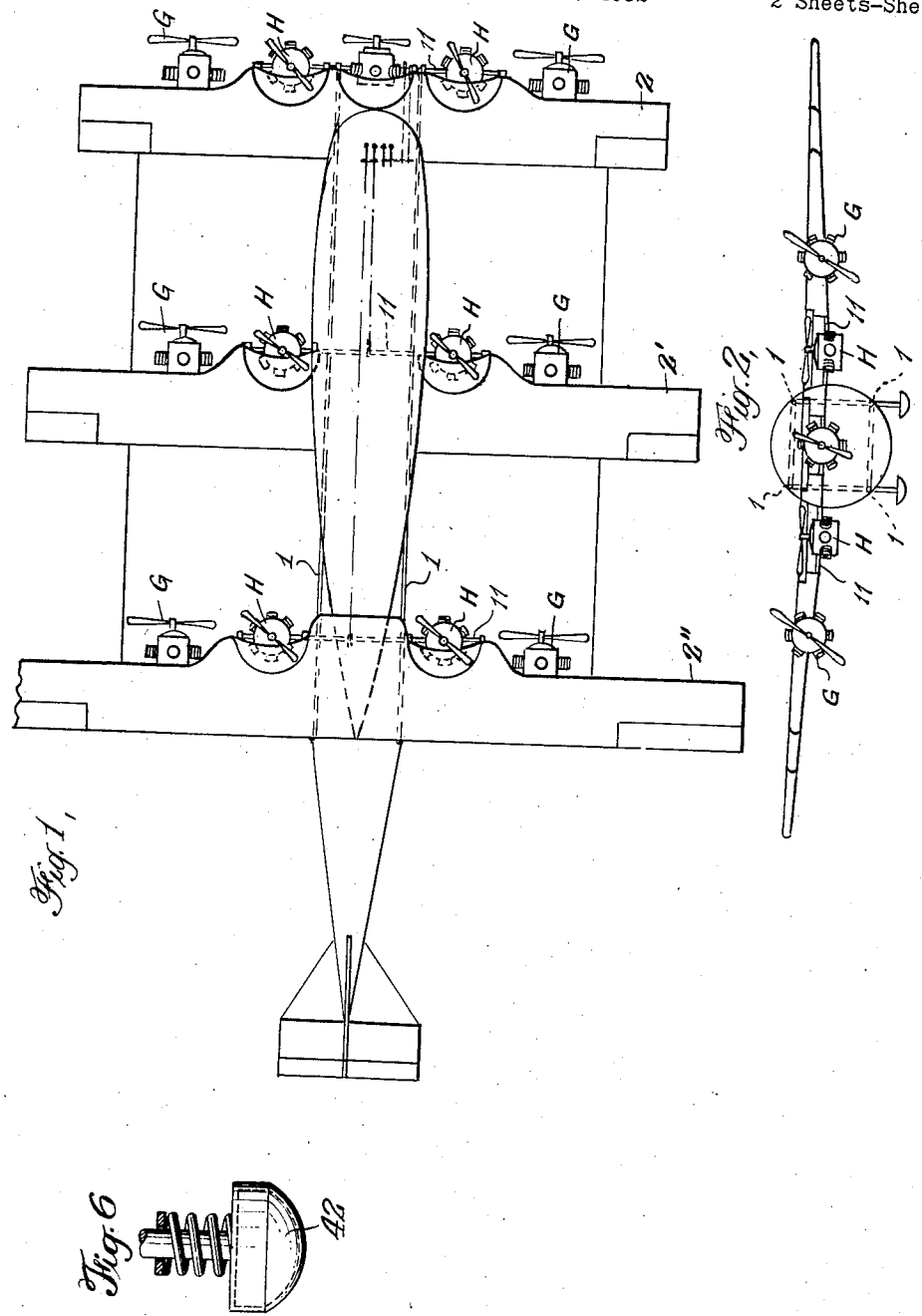

Patented Jan. 15, 1935

1,987,788

UNITED STATES PATENT OFFICE 1,987,788

AIRCRAFT

Benjamin A. Morton, New York, N. Y.

Application December 3, 1932, Serial No. 645,540

7 Claims. (Cl. 244—25)

This invention relates to aircraft, and particularly to those of the heavier-than-air type, and its broad object is to provide a generally improved heavier-than-air flying machine.

One of the particular objects of the invention is to provide a heavier-than-air aircraft which will be safer in flight than the ordinary airplane but in which the safety provisions will, instead of as usual detracting from the air-speed of the craft, materially augment the forward speed of the craft in normal flight.

Another object of the invention is to provide a heavier-than-air aircraft which will be easier and safer to take-off and land than the ordinary airplane, and which will be less likely to crack up on a rough landing either on water or on land.

With these and other objects, hereinafter appearing, in view, my invention comprises the combinations, sub-combinations, elements, and features hereinafter particularized, and illustrated by way of example in the accompanying drawings.

In these drawings

Fig. 1 is a plan of another embodiment of my inventive concepts;

Fig. 2 is a front elevation of same;

Fig. 3 is a plan of still another embodiment;

Fig. 4 is a front elevation of same;

Fig. 5 is a side elevation of same;

Fig. 6 is a structural detail of the landing gear of the craft shown in Fig. 2.

Except where obviously impossible, the aircraft of the present invention are to be regarded as the ordinary aircraft in all particulars other than the improved features added thereto by the present invention. That is to say, all the structure and improvements of ordinary airplanes are to be assumed as incorporated herein except where incompatible with the present concepts of improvement.

The wings are mounted and attached to the backbone with a slight, and preferably progressively rearwardly decreasing, longitudinal dihedral for lateral stability and have the usual ailerons and controls therefor. In order to neutralize the decreasing-lift effect of disturbed air on the lift characteristic of wings when in tandem, the wings 2' are made of longer span and greater chord than wings 2, and 2" of greater span than 2'.

The covered nose of the cabin is indented circularly as shown at 9, to form the relative wind into forwardly-directed eddies at the edge thereof which tend to create a vacuum thus reducing the head-resistance somewhat.

The engine structure for the airplane includes one tandem row of fixedly mounted power-units G on the port side supported in the usual ring-mount, strut-braced fashion in the cantilever monoplane wing structure, and three similar axially aligned power-units G on the starboard side. Closer inboard on the port side are three 90°-revoluble, axially aligned power-units H in which the engine-airscrew units are mounted on shafts 11 for rotation from a vertical plane to a horizontal plane through 90°. When lying in the horizontal plane, the propellers sweep over a dished-out area on the leading edge portion of the respective wings so that the slip-stream from the horizontally revolving propellers is added to, and enhances the effect of the relative wind when slipping over the upper camber or top surface of the wing, thereby increasing the negative pressure and adding materially to the lift. This effect, combined with the vertical thrust of the propellers when the power-units are rotated into this position, aids materially in flattening out the gliding angle and checking the forwardly gliding motion of the aircraft while landing so that landing speeds are reduced to the minimum and long "runs" are obviated, thereby enhancing the safety and ease of landing heavier-than-air aircraft. When in normal horizontal or other altitude flight, the inboard engines are turned so as to have their axes horizontal, and thus merely aid by their cumulative thrust in increasing the forward airspeed of the aircraft. If desired, however, the units H may be turned as shown in Fig. 1 even for horizontal flight.

The aircraft shown in Fig. 3, comprises a conventional fuselage construction 12, in this case a monocoque type, having the general configuration of an elongated drop of falling water, and three lift surfaces 13, 14, and 15, arranged in tandem and pin-hinged to the fuselage, the span of the intermediate lift surface being greater than the foremost and aftermost. The lift surfaces in the center or the intermediate lift surfaces are rigged in the biplane box girder type of construction, and the forward and aft lift surfaces are monoplane, cantilever-braced types. A single main landing carriage 16 is provided at or near the center of gravity and a tail wheel or skid 17 is provided in the proper position near the tail group. The entering edge of each of the lift surfaces is kerfed, or annularly indented or dished as shown at 18, and has a power-unit 19 consisting of a radial air-cooled engine and a tractor airscrew driven directly thereby, mounted therein on an axle 20 in such a way that it may be rotated about its axle through 90° from horizontal to vertical position. None of the power-units is axially aligned with another, so that no airscrew has to work in the slip-stream of another one.

The forward and aft wings are arranged in the plane of the horizontal axis of the craft, both wings 13 and 15 lying in the same plane, and about midway in height between the plane of the two main lift surfaces 14. The two main wings or intermediate wings, 14, are of greater span than the forward and aft lift groups and the gap between them is about two feet greater than that ordinarily employed. The two main wings 14 are located at the center of gravity and center of lift, and the engines and wings are in balance above and below the longitudinal axis of the craft, as well as around the lateral axis of the craft.

The forward wing and the aft wing are of lesser span than the intermediate wings, and function primarily as supports for the engines shown, though having the usual lift-section profile, span, chord, taper, and the chord 20 back of the indentations 18 is made greater than elsewhere to make up for the loss of lift-chord due to the dish-in. Internally braced protuberances 21 are formed adjacent the indentations in order to take the load off the weakened portions of the wing. The short forward wing creates little disturbed air with reference to the uppermost of the two central wings so that there is very little interference loss, and the aft wing is above the wash area of the lower central wing, and below the top central wing, thereby also reducing the interference. If desired, the engines may be mounted fixedly on the respective wings and streamlined thereinto with cowling and fairing in the usual manner instead of being swiveled as shown. If desired also, engines may be omitted from the forward and aft wings and provided in fixed mountings on the central wings only. Also, in this last form the engines may be swiveled instead of fixed.

In any case, the engines can be operated so as to reduce the airspeed and the ground-speed of the craft after it strikes the ground so as to make landing easier and safer.

A detailed showing of the particular type of landing gear is presented in Fig. 6. The landing gear comprises a pair of "spoons" 42 arranged on the fuselage at suitable points. These "spoons" enable a plane to land upon rough ground at any angle and thereby increase the safety factor of my device.

Various modifications in details of engineering structure or in the mechanical refinements of parts are contemplated as within the scope of the present invention insofar as they are included within the scope of the sub-joined claims.

I claim:

1. An aeroplane-type aircraft, comprising a fuselage, a lift-surface supported thereby, and having an entering-edge, motive-units pivotally supported near the entering-edge of the lift-surface for rotation from a vertical plane to a horizontal plane overlying the lift-surface, the lift-surface thereunder being kerfed-out to form a configuration resembling a portion of a saucer, the central plane of the horizontal airscrew-path being tangent to the upper outer edge of the kerf, whereby the slipstream of the airscrew is directed over across the lift-surface to add to the negative pressure of the relative wind on the upper surface of the lift-surface.

2. An aeroplane-type aircraft, comprising a cabin, a lift-surface supported thereby, motive-units pivotally supported near the entering-edge of the lift-surface for rotation from a vertical plane to a horizontal plane overlying the lift-surface, the lift-surface thereunder being kerfed-out to form a configuration resembling a portion of a saucer, the central plane of the horizontal airscrew-path being tangent to the upper outer edge of the kerf whereby the slipstream of the airscrew is directed over across the lift-surface to add to the negative pressure of the relative wind on the upper-surface of the lift-surface.

3. An aeroplane-type aircraft, comprising a plurality of streamlined, tubular, longitudinals connected around the circumference of a circle, a lift-surface supported thereby, motive-units pivotally supported near the entering-edge of the lift surface for rotation from a vertical plane to a horizontal plane overlying the lift-surface, the lift-surface thereunder being kerfed-out to form a configuration resembling a portion of a saucer, the central plane of the horizontal airscrew-path being tangent to the upper outer edge of the kerf whereby the slipstream of the airscrew is directed over across the lift-surface to add to the negative pressure of the relative wind on the upper-surface of the lift-surface.

4. An aeroplane-type aircraft comprising a fuselage, a lift-surface supported thereby, vertically rotatable engine-propeller units in tandem and tandem pairs pivotally supported near the entering-edge of the lift-surface for rotation from a vertical plane to a horizontal plane overlying the lift-surface, the lift-surface thereunder being kerfed-out to form a configuration resembling a portion of a saucer, the central plane of the horizontal airscrew-path being tangent to the upper outer edge of the kerf whereby the slipstream of the airscrew is directed over across the lift-surface to add to the negative pressure of the relative wind on the upper-surface of the lift-surface.

5. An aeroplane-type aircraft, comprising a fuselage, a lift-surface supported thereby and having an entering-edge, several sets of motive-units, one set of which is fixedly mounted, the other is pivotally supported near the entering-edge of the lift-surface for rotation from a vertical plane to a horizontal plane overlying the lift-surface, the lift-surface thereunder being kerfed-out to form a configuration resembling a portion of a saucer, the central plane of the horizontal airscrew-path being tangent to the upper outer edge of the kerf, whereby the slipstream of the airscrew is directed over across the lift-surface to add to the negative pressure of the relative wind on the upper surface of the lift-surface.

6. An aeroplane-type aircraft, comprising a fuselage, lift-surfaces supported thereby, said lift-surfaces being arranged in tandem and of unequal breadth and having an entering edge, motive-units pivotally supported near the entering edge of the lift-surface for rotation from a vertical plane to a horizontal plane overlying the lift-surfaces, the lift-surfaces thereunder being kerfed-out to form a configuration resembling a portion of a saucer, the central plane of the horizontal airscrew-path being tangent to the upper outer edge of the kerf, whereby the slipstream of the airscrew is directed over across the lift-surfaces to add to the negative pressure of the relative wind on the upper surface of the lift-surfaces.

7. An aeroplane-type aircraft, comprising a fuselage, said fuselage having a circularly indented nose whereby the relative wind is formed into forwardly directed eddies at the edge thereof which tend to create a vacuum, a lift-surface supported thereby and having an entering edge, motive-units pivotally supported near the entering edge of the lift-surface for rotation from a vertical plane to a horizontal plane overlying the lift-surface, the lift-surface thereunder being kerfed-out to form a configuration resembling a portion of a saucer, the central plane of the horizontal airscrew-path being tangent to the upper outer edge of the kerf, whereby the slipstream of the airscrew is directed over across the lift-surface to add to the negative pressure of the relative wind on the upper surface of the lift-surface.

BENJAMIN A. MORTON.